United States Patent
Kimura et al.

[11] Patent Number: 5,828,970
[45] Date of Patent: Oct. 27, 1998

[54] SUSPENSION CONTROL SYSTEM FOR AUTOMOTIVE VEHICLE

[75] Inventors: Makoto Kimura; Toru Takahashi; Hiroyuki Shimizu, all of Kanagawa Prefecture, Japan

[73] Assignee: Atsugi Unisia Corporation, Japan

[21] Appl. No.: 924,630

[22] Filed: Aug. 4, 1992

[30] Foreign Application Priority Data

Aug. 6, 1991 [JP] Japan .................................. 3-196833
Feb. 4, 1992 [JP] Japan .................................. 4-019088

[51] Int. Cl.$^6$ ............................................. B60G 17/015
[52] U.S. Cl. .............................................. 701/37; 280/707
[58] Field of Search ...................... 364/424.01, 424.05; 280/707, 840, 703; 701/36, 37, 38

[56] References Cited

U.S. PATENT DOCUMENTS

| | | | |
|---|---|---|---|
| 4,838,574 | 6/1989 | Baraszu | 364/424.01 |
| 4,953,089 | 8/1990 | Wolfe | 364/424.05 |
| 5,063,512 | 11/1991 | Kamimura et al. | 364/424.05 |
| 5,075,855 | 12/1991 | Sugasawa et al. | 364/424.05 |
| 5,189,614 | 2/1993 | Mitsuoka et al. | 364/424.05 |

FOREIGN PATENT DOCUMENTS

| | | |
|---|---|---|
| 59-117510 | 8/1984 | Japan . |
| 61-163011 | 7/1986 | Japan . |
| 64-60411 | 7/1989 | Japan . |

*Primary Examiner*—William A. Cuchlinski, Jr.
*Assistant Examiner*—Ed Pipala
*Attorney, Agent, or Firm*—Rader, Fishman & Grauer

[57] ABSTRACT

A suspension control system for an automotive vehicle is disclosed in which a band pass filter is provided which passes only a frequency component of either of a vertical sprung mass acceleration signal derived from a vertical G sensor or a vertical sprung mass speed signal derived from an integrator which integrates the vertical sprung mass acceleration signal, both vertical acceleration sprung mass speed signal and vertical sprung mass speed signal falling in a predetermined frequency range (e.g., 0.5 Hz through 3.0 Hz). A control unit outputs a control signal to an actuator so to vary the position of an adjuster of each or any one of shock absorbers, thus a damping coefficient being set to a target damping coefficient position according to the vertical sprung mass speed.

12 Claims, 16 Drawing Sheets

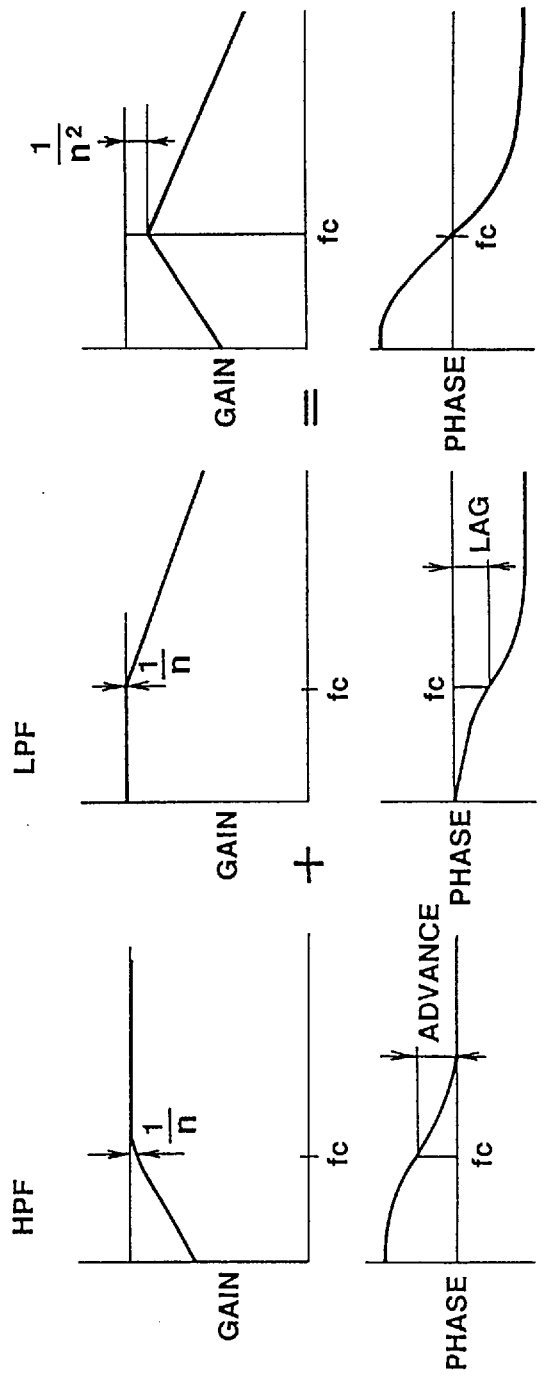

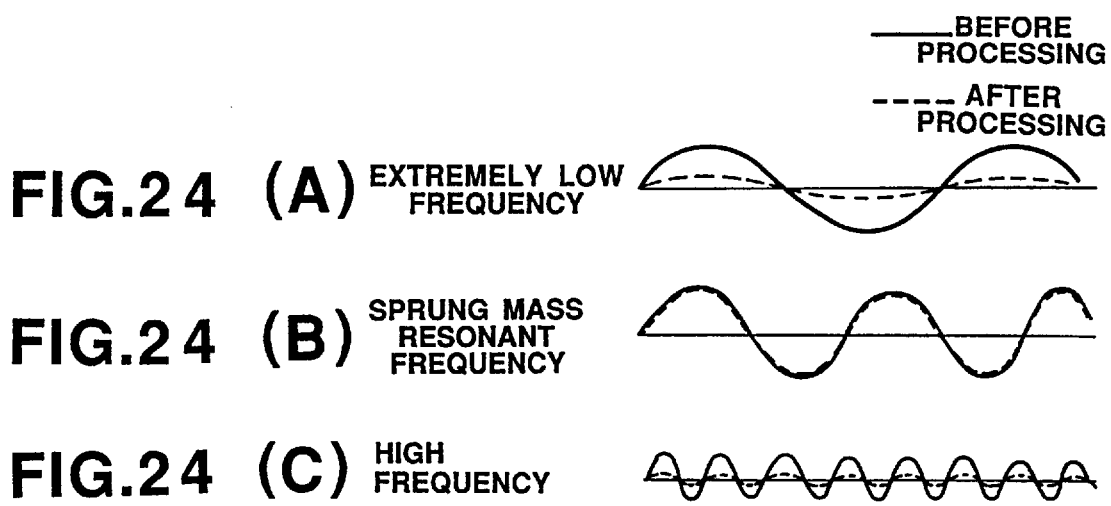
FIG.24 (A) EXTREMELY LOW FREQUENCY
FIG.24 (B) SPRUNG MASS RESONANT FREQUENCY
FIG.24 (C) HIGH FREQUENCY
FIG.25
FIG.26
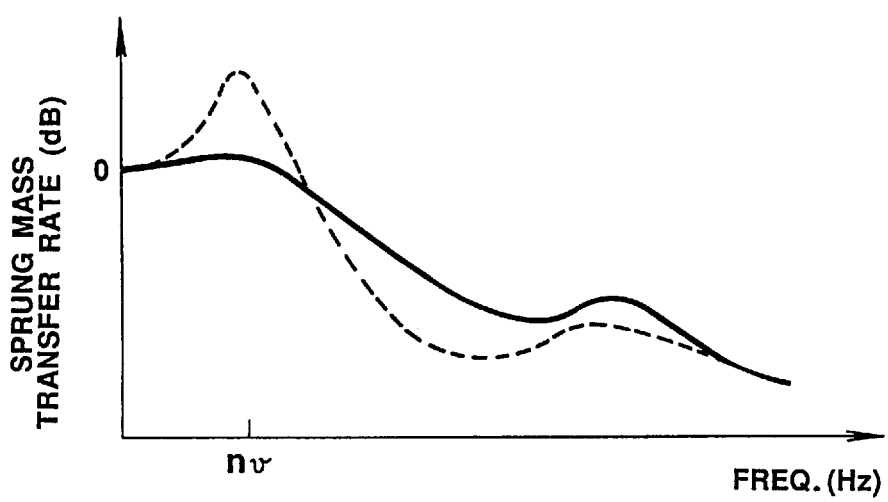

SUSPENSION CONTROL SYSTEM FOR AUTOMOTIVE VEHICLE

BACKGROUND OF THE INVENTION:

1. Field of The Invention

The present invention relates to a suspension control system for an automotive vehicle which executes a damping coefficient control for a shock absorber(s) (the shock absorber is also referred to as a damper, but hereinafter referred to as shock absorber). The present invention, particularly, relates to the suspension control system for the automotive vehicle in which a vertical sprung mass acceleration is processed to drive a vertical sprung mass speed.

2. Description of The Background Art

A Japanese Patent Application First Publication No. Showa 61-163011 exemplifies a previously proposed suspension control system for an automotive vehicle.

In the previously proposed suspension control system, a sensor for detecting an sprung mass vertical acceleration is provided and the sprung mass acceleration is integrated to derive the vertical sprung mass speed (viz., velocity). Thereafter, the previously proposed suspension control system controls a damping coefficient to either low damping coefficient position or high damping coefficient position on the basis of the sprung mass vertical speed.

The previously proposed suspension control system only integrates the vertical sprung mass acceleration. In a case where the data obtained from the sprung mass vertical acceleration sensor is subject to a zero crossing point drift due to ambient influences, the drift is also integrated in spite of a 0 m/s of the sprung mass vertical speed. Accordingly, the control unit may erroneously determine that a vertical sprung mass speed exists.

In addition, in the case where the vehicle runs on an ascending slope or the sprung mass vertical acceleration sensor becomes inclined with respect to a normal vertical position due to vibrations or due to loose connections, the vertical sprung mass speed is offset in the upward direction or in the downward direction so that an erroneous damping coefficient position can be derived.

In addition, since the control reflects a higher frequency component of the vertical acceleration sprung mass which is not necessary for the control, the following defects occur.

In FIG. 26, the broken line denotes the shock absorber fixed to a low damping coefficient position and a solid line denotes a sprung mass vertical transfer rate characteristic of the previously proposed suspension control system.

As shown in FIG. 26, the shock absorber of the previously proposed suspension control system can improve steering stability with a transfer rate toward the sprung mass suppressed in a low frequency region in the vicinity to a sprung mass resonant frequency $n_u$.

On the contrary, the sprung mass transfer rate is increased over a predetermined frequency and a high frequency vibration is input to a vehicle body. Thus, the vehicular comfort becomes worsened.

SUMMARY OF THE INVENTION

It is, therefore, a principal object of the present invention to provide an improved suspension control system for an automotive vehicle in which a drift of a zero crossing point of a vertical sprung mass speed is prevented and, in addition, a vehicular comfort at the time of high frequency input can be improved.

The above-described object can be achieved by providing a suspension control system for an automotive vehicle, comprising: a) at least one shock absorber, interposed between a vehicle body and a tire wheel, having a piston member and a damping coefficient varying means therein, said damping coefficient varying means operatively changing its position in response to a control signal so that a damping coefficient of at least one of both extension and contraction stroke sides of the piston member is set to a target damping coefficient position; b) at least one sprung mass acceleration detecting means for detecting a vertical sprung mass acceleration and outputting a vertical sprung mass acceleration signal indicative thereof; c) at least one sprung mass speed detecting means for integrating the vertical sprung mass acceleration signal to derive a vertical sprung mass speed signal indicative thereof; d) a band pass filter for passing only a frequency component of either the vertical sprung mass acceleration signal or the vertical sprung mass speed signal whose frequency falls in a predetermined frequency region defined thereby with an inherent sprung mass resonant frequency as a center; e) setting means for calculating a threshold value for the vertical sprung mass speed signal value; f) determining means for determining whether the vertical sprung mass speed signal value derived through the band pass filter is below the predetermined threshold value; and g) controlling means for outputting the control signal to the damping coefficient varying means according to a result of determination of the determining means so as to control the damping coefficient to the target damping coefficient.

BRIEF DESCRIPTION OF THE DRAWINGS

FIGS. 23(A), 23(B) and through 23(C) are graphs showing the relationship between gains and phases in the respective filters shown in FIG. 22.

FIGS. 24(A), 24(B) and through 24(C) are waveform charts showing extremely low frequencies, sprung mass resonant frequencies, and high frequency components obtained in connection with the third preferred embodiment.

FIG. 25 is a graphical comparison of a sprung mass velocity having an extremely low frequency component, before filtering (broken line) with the same signal after filtering (solid line) in accordance with the third embodiment of the present invention.

FIG. 26 is a graph showing in solid line, the sprung mass transfer rates that occur in the arrangement disclosed in Japanese Patent Application First Publication No. Showa 61-163011, discussed in the opening paragraphs of the disclosure under heading of BACKGROUND OF THE INVENTION, along with a comparative broken line trace which demonstrates the transfer rate produced when the damping force coefficient of a shock absorber is fixed.

DESCRIPTION OF THE PREFERRED EMBODIMENT

Reference will, hereinafter, be made to the drawings in order to facilitate a better understanding of the present invention.

(First Preferred Embodiment)

Figure 1:
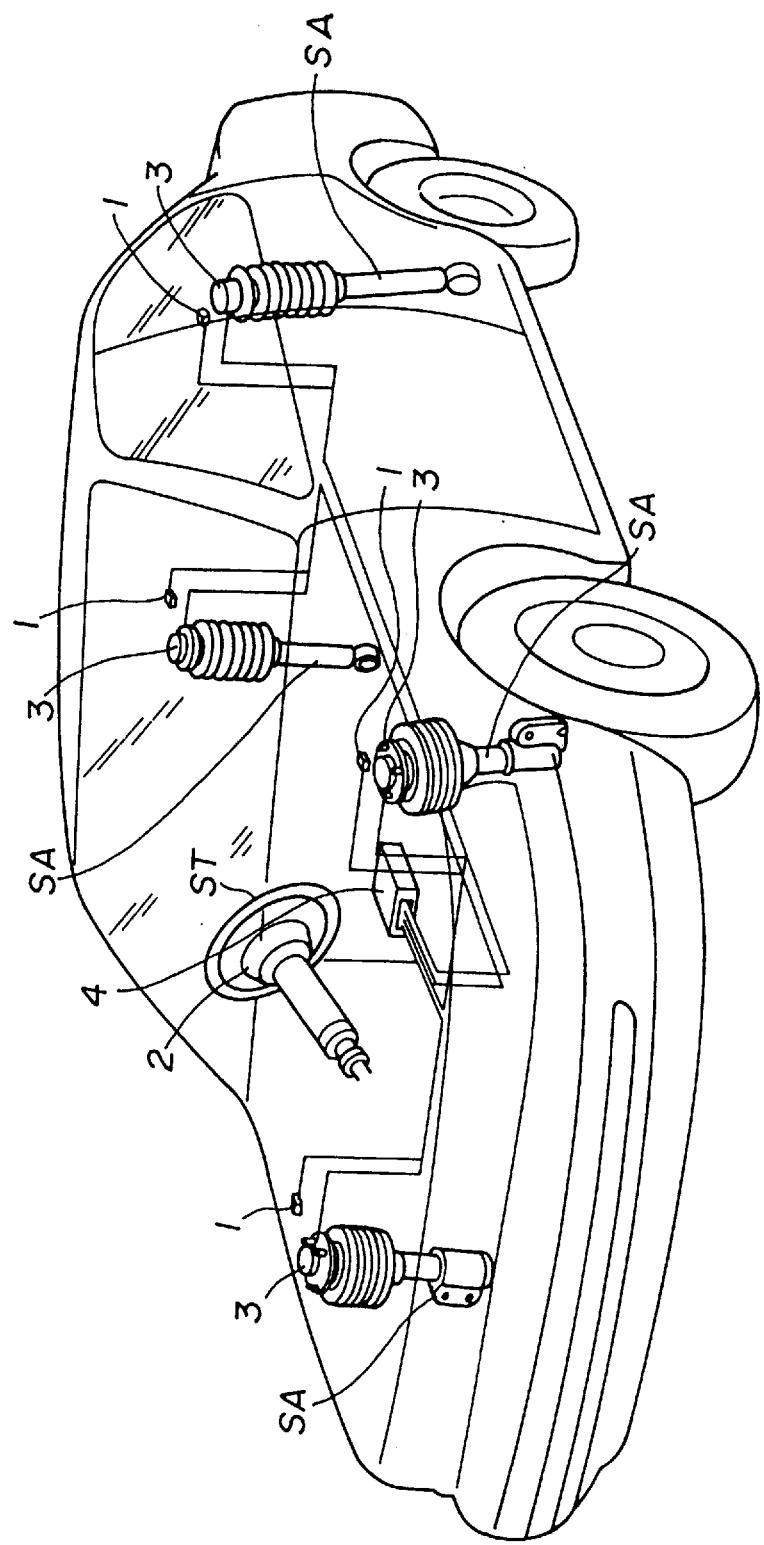
FIG. 1 is a perspective schematic view of a suspension control system applied to an automotive vehicle.

FIG. 1 shows a vehicular suspension control system configured in accordance with a first preferred embodiment according to the present invention.

As shown in FIG. 1, four shock absorbers SA are interposed between a vehicular body and respective road wheels. A vertical (upward and downward with respect to the vehicle body) sprung mass acceleration sensor (hereinafter, referred to as a vertical G sensor) is disposed on a part of the vehicle body adjacent to each shock absorber SA. In addition, a steering angle sensor 2 is attached onto a steering wheel ST.

A control unit 4 is installed in the vehicle body adjacent to a vehicular driver (occupant) seat for receiving signals derived from each sensor 1 and 2 and for outputting a drive signal to a pulse motor 3 of each shock absorber SA.

Figure 2:
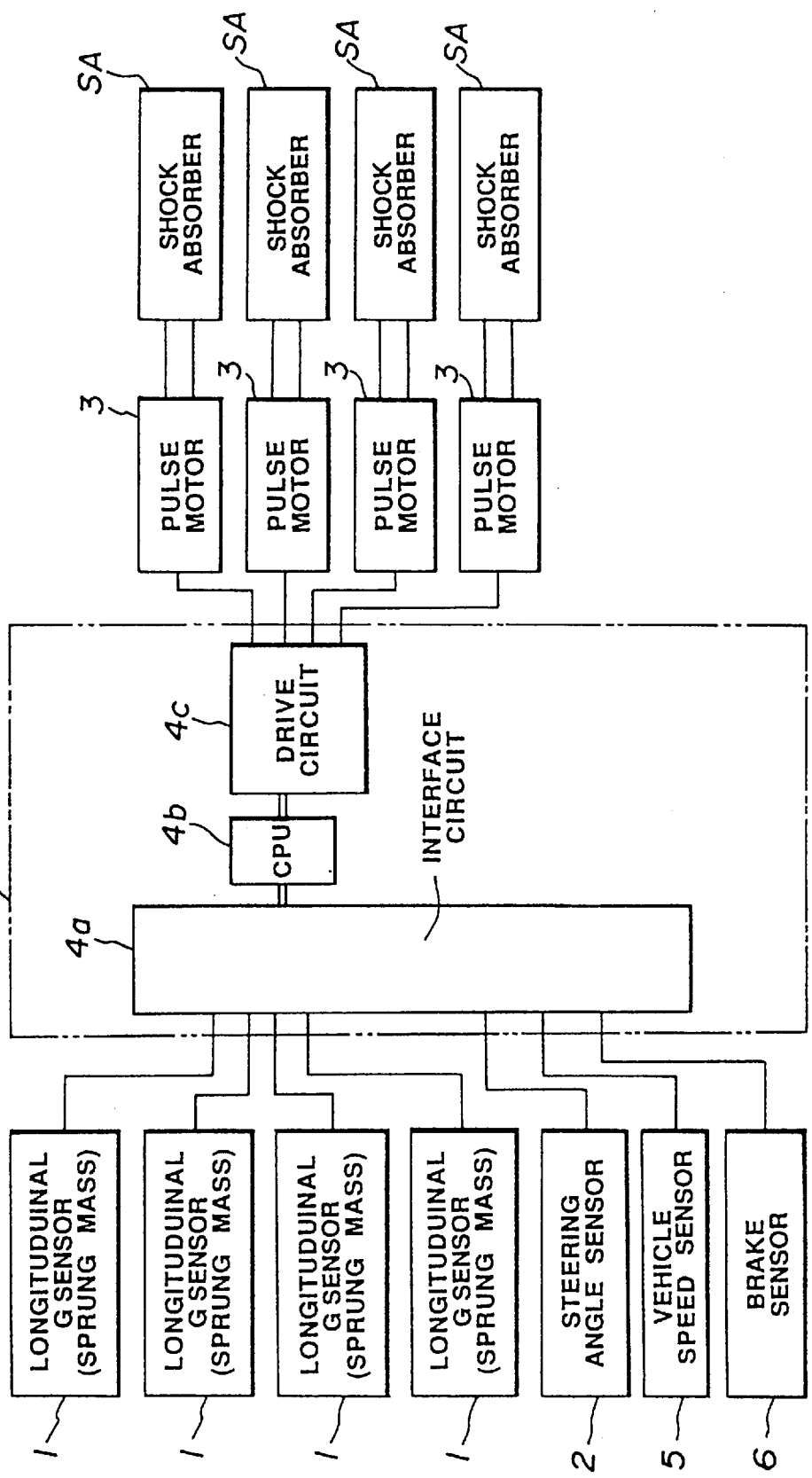
FIG. 2 is a circuit block diagram of a suspension control system according to a first preferred embodiment of the present invention.

FIG. 2 shows a circuit block diagram of the suspension control system in the first preferred embodiment according to the present invention.

The control unit 4 includes: an interface circuit 4a; a CPU (Central Processing Unit) 4b; and drive circuit 4c. The interface circuit 4a receives sensor signals from a vehicle speed sensor 5 and brake sensor 6 in addition to each of the other sensors 1 and 2.

The interface circuit 4a includes a high pass filter 4d. Each sensor signal from the vertical G sensors 1 is directly input to a high pass filter circuit 4d which is included in of the interface circuit 4d before being supplied to the CPU. It is noted that the high pass filter 4d serves to pass only high harmonic frequency components including the unsprung mass resonant frequency components from among the vertical acceleration signals derived from the vertical G sensors 1.

Figure 3:
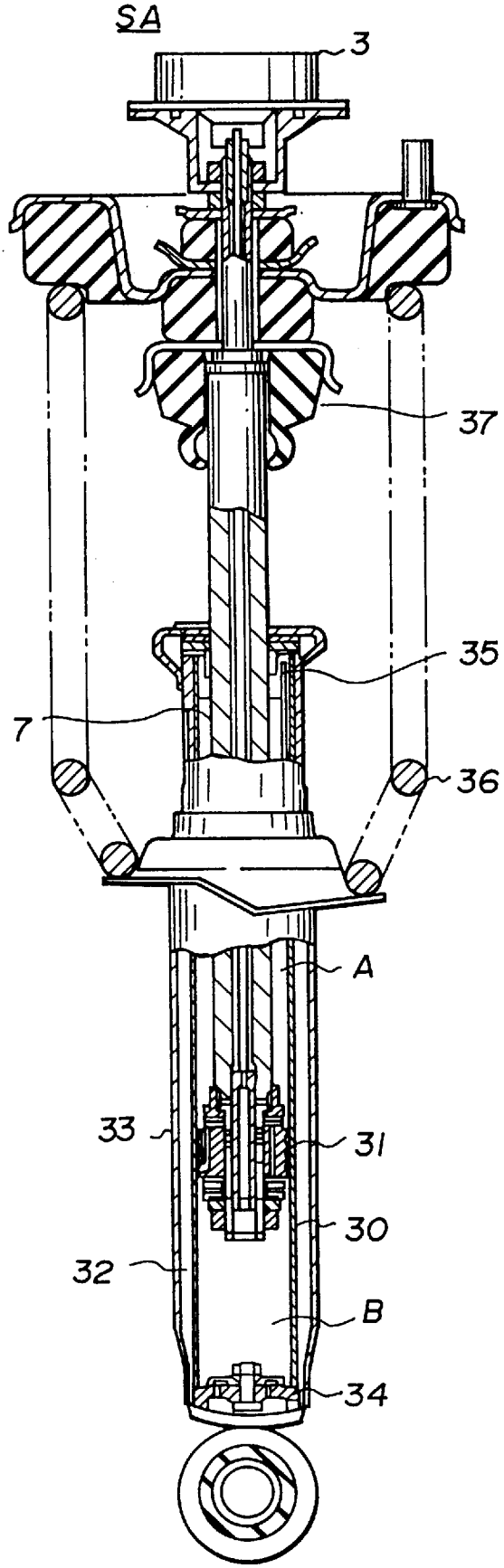
FIG. 3 is an enlarged cross-sectional view of a shock absorber SA used in the first preferred embodiment shown in FIG. 2.

Next, FIG. 3 shows a cross sectional structure of each shock absorber SA.

The shock absorber SA shown in FIG. 3 includes: a cylinder 30; a piston 31 for defining both upper and lower chambers A and B; an outer envelope 33 which forms a reservoir chamber 32 on the outer periphery of the cylinder 30; a base (or bottom base) 34 for defining the lower chamber B and reservoir chamber 32; a guide member 35 for defining the lower chamber B and reservoir chamber 32; a guide member 35 for guiding a slide motion of a piston rod 7 linked to the piston main body 32; a suspension spring 36 interposed between the outer envelope 33 and vehicular body; and a bumper rubber member (or bushing) 37.

Figure 4:
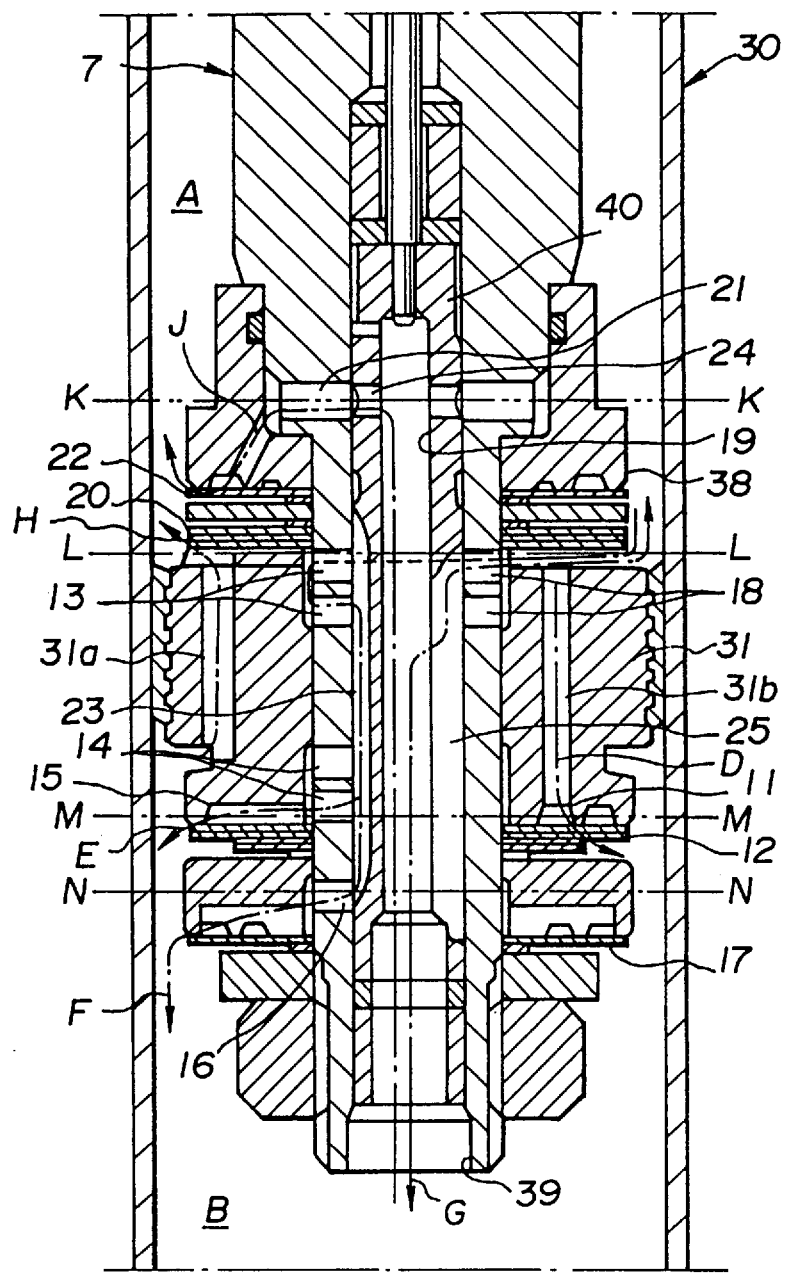
FIG. 4 is a cross-sectional view of a piston used in the shock absorber shown in FIG. 3.

FIG. 4 shows an enlarged cross sectional view of the piston 31.

As shown in FIG. 4, penetrating holes 31a, 31b are formed in the piston 31. In addition, an extension stroke side damping valve 12 and contraction stroke side damping valve 20 are installed which open or close the respective penetrating holes 31a, 31b, respectively.

A communication hole 39 is formed in a tip of a piston rod 7 which extends through the piston 31. The communication hole 39 serves to communicate the upper chamber A and lower chamber B. Furthermore, the adjuster 40 in FIG. 4 serves to adjust a flow passage area of the communication hole 39. An extension stroke check valve 17 and contraction stroke check valve 22 are installed which enable and disable the flow through the communication hole 39 according to the direction of the flow of the fluid. As shown in FIG. 3, the adjuster 40 is rotated by pulse motor 3.

In addition, first port 21, second port 13, third port 18, fourth port 14, and fifth port 16 are formed on the tip of the piston rod 7. Numeral 38 in FIG. 4 denotes a retainer on which the contraction stroke check valve 22 is seated.

On the other hand, the adjuster 40 is formed with a hollow portion 19, a first lateral hole 24 and second lateral hole 25. Furthermore, a longitudinal groove 23 is formed in an outer periphery of the adjuster 40. The first lateral hole 24 and second lateral hole 25 serve to communicate between the inner and outer portions of the adjuster 40.

Hence, four fluid flow passages are formed between the upper chamber A and lower chamber B as fluid flow communicable passages in the extension stroke:

1) a first extension stroke flow passage D which leads from the penetrating hole 31b to the lower chamber B via an inner side of the opened extension damping valve 12;

2) a second extension stroke flow passage E which leads from the second port 13, vertical groove 23, and fourth port 14 to the lower chamber B via the outer periphery of the extension stroke damping valve 12;

3) a third extension stroke flow passage F which leads from the second port 13, vertical groove 23, and fifth port 16 to the lower chamber B via the opened extension stroke check valve 17; and 4) a bypass flow passage G which leads from the third port 18, second lateral hole 25, and hollow portion 19 to the lower chamber B.

On the other hand, to enable contraction stroke flows, the following three passages are formed:

1) a first contraction stroke flow passage H leading from the penetrating hole 31a to the upper chamber A via the opened contraction stroke damping valve 20;

2) a second contraction stroke flow passage J leading from the hollow portion 19, first lateral hole 24, and first port 21 to the upper chamber A via the opened contraction stroke check valve 22; and 3) a bypass flow passage G leading from the hollow portion 19, second lateral hole 25, and third port 18 to the upper chamber A.

Figure 5:
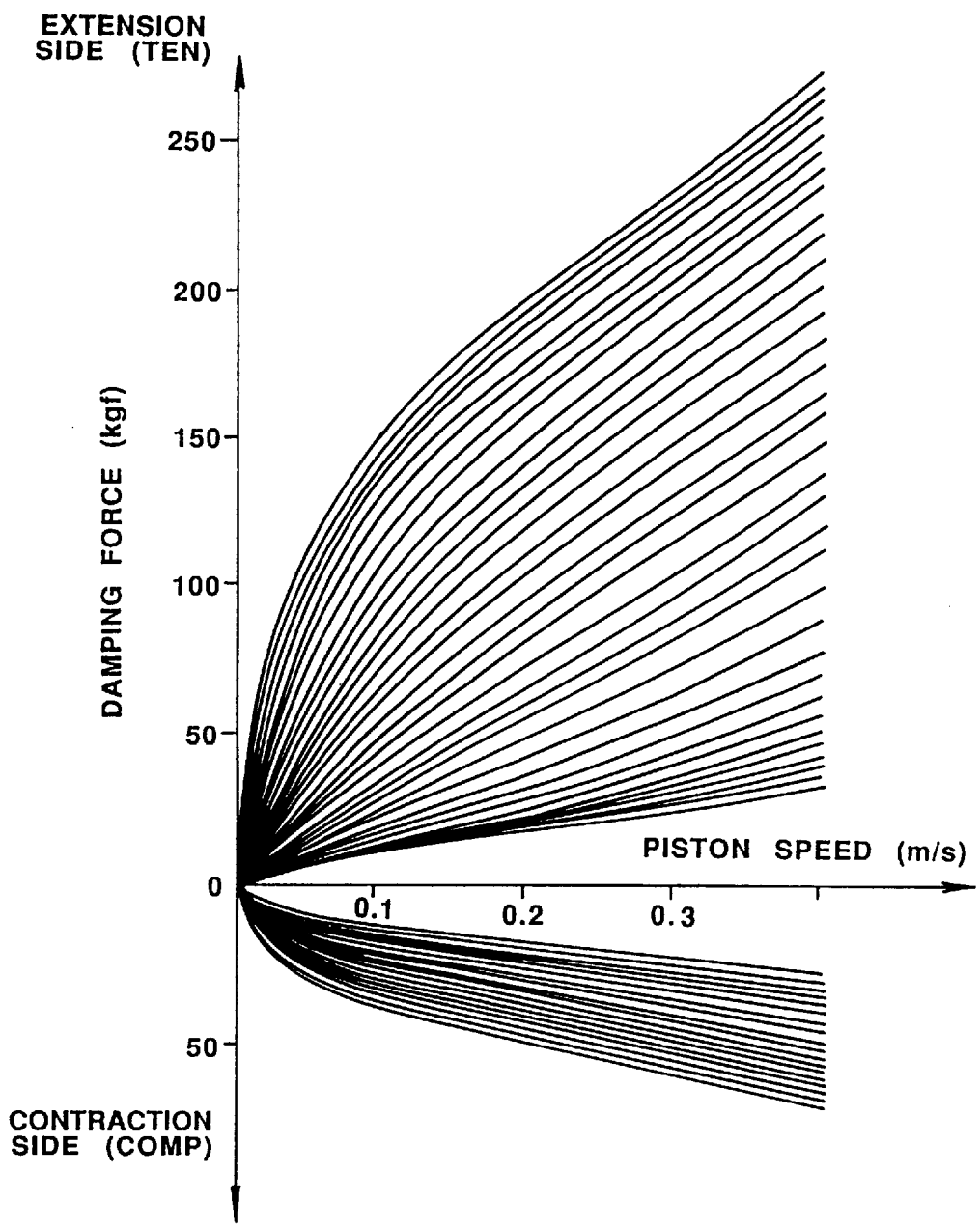
FIG. 5 is a characteristic graph showing the relationship between the multiple damping coefficient stages and the piston speed of the shock absorber shown in FIG. 4.

That is to say, each shock absorber SA is so constructed that its damping coefficient is variable in multiple stages from a lowest damping coefficient position (Hereinafter, also referred to as a soft position) on the basis of the rotational motion of the adjuster 40 rotated by means of the pulse motor (servo motor) during both extension and contraction strokes, as shown in FIG. 5. It is to be noted that in this figure contraction is alternatively referred to as compression (COMP) and extension is alternatively as tension.

Figure 6:
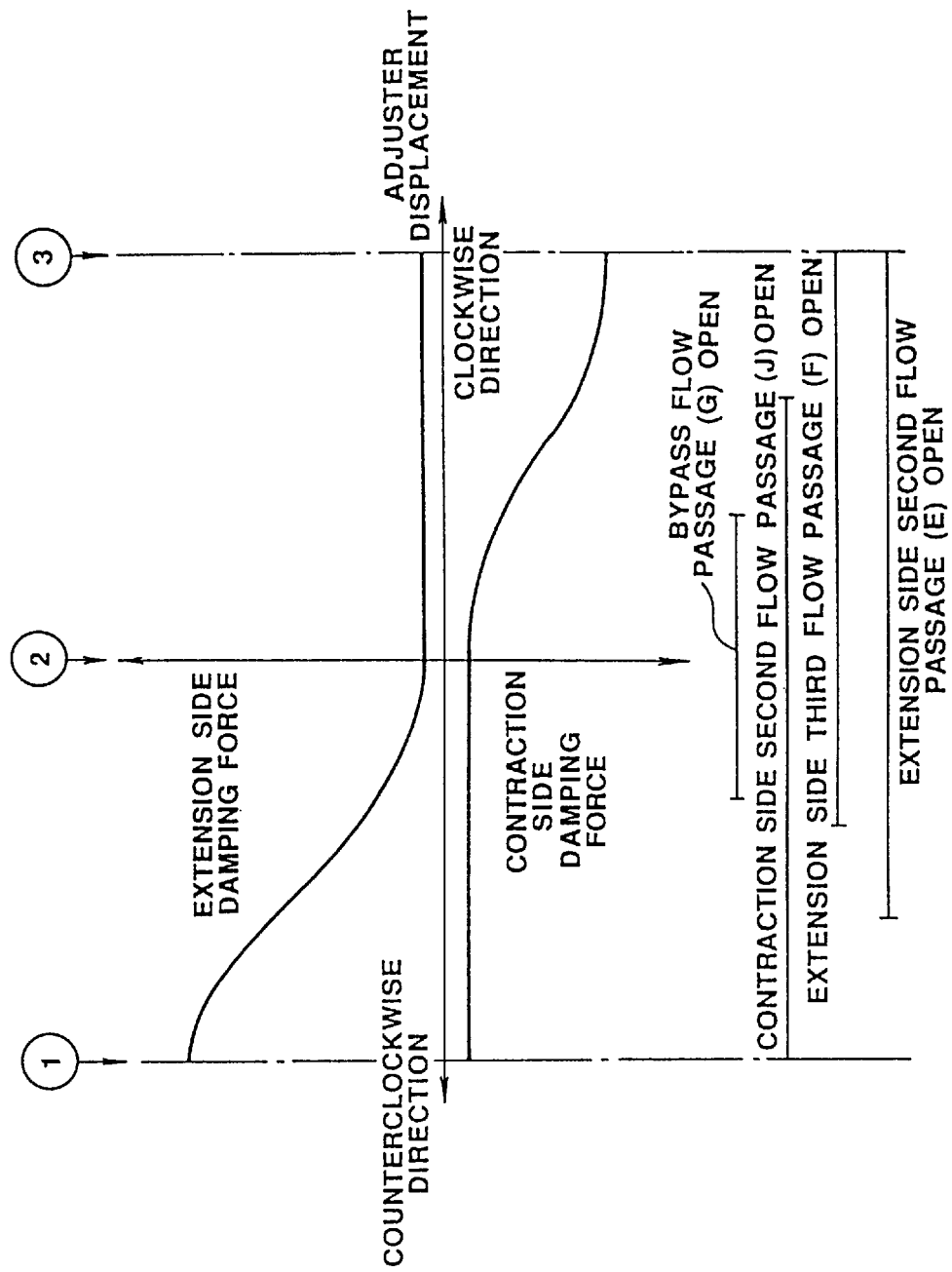
FIG. 6 is a chart showing the variation in damping coefficient during extension and contraction strokes, induced by the rotation of an adjuster in the shock absorber.
Figure 7:
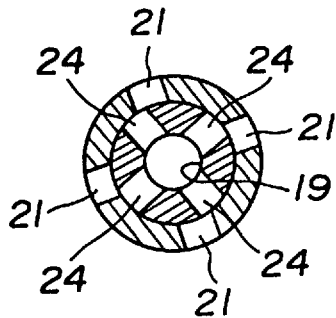
FIGS. 7(A), 7(B), 7(C), 8(A), 8(B), 8(C), 9(A), 9(B) and 9(C) are sectional plan views of the adjuster and communication holes depicting the positions of the adjuster with respect to a communication port.
Figure 7:
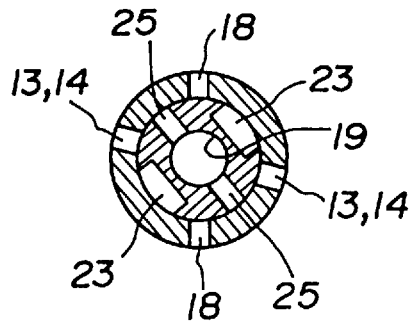
Figure 7:
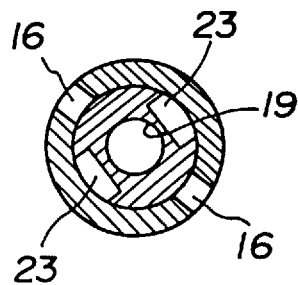
Figure 8:
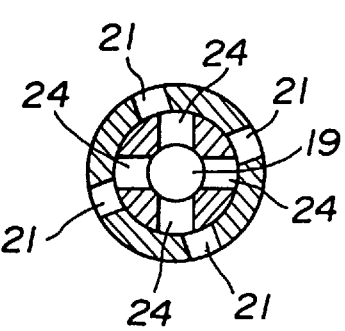
Figure 8:
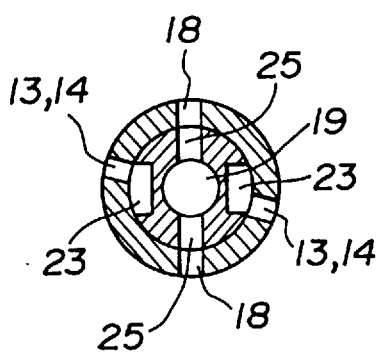
Figure 8:
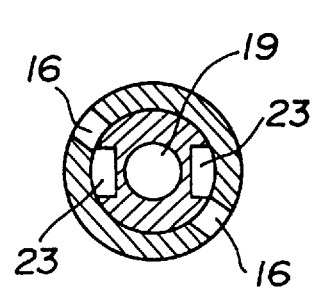
Figure 9:
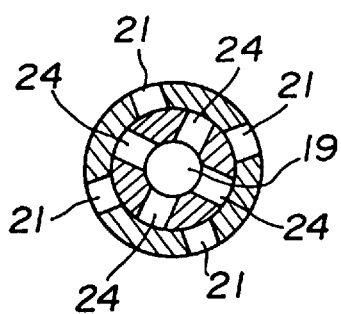
Figure 9:
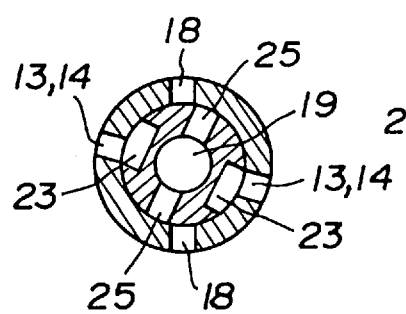
Figure 9:
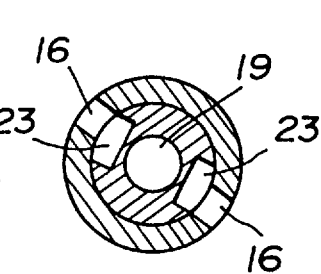

In addition, as shown in FIG. 6, when the adjuster 40 is turned (rotated) in a counterclockwise direction as viewed in FIG. 4 with the damping coefficients for both extension and contraction strokes set in the soft (S) positions, only the damping coefficient for the extension stroke is changed to the hard position (H). On the contrary, if the adjuster 40 is rotated in the clockwise direction, only the damping coefficient for the contraction stroke is changed to the hard position (H).

It is noted that, in FIG. 6, when the adjuster 40 is rotated and halted it assumes one of the three positions 1, 2 and 3. These positions are shown in views taken along the section lines K—K, M—M, and sectioned line N—N, as shown in FIGS. 7(A), 8(A), and 9(A), FIGS. 7(B), 8(B), and 9(B), and FIGS. 7(C), 8(C), and 9(C), respectively.

Figure 10:
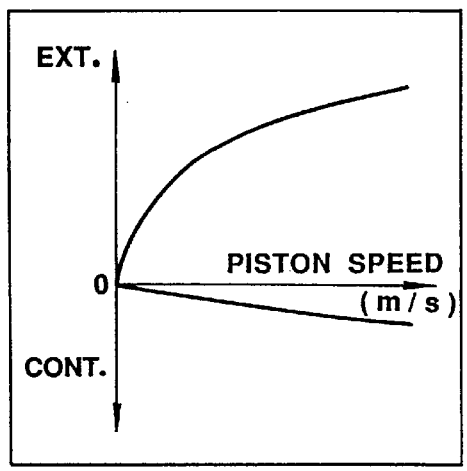
FIGS. 10, 11 and through 12 are graphs showing relationships between damping coefficient and piston speed.
Figure 11:
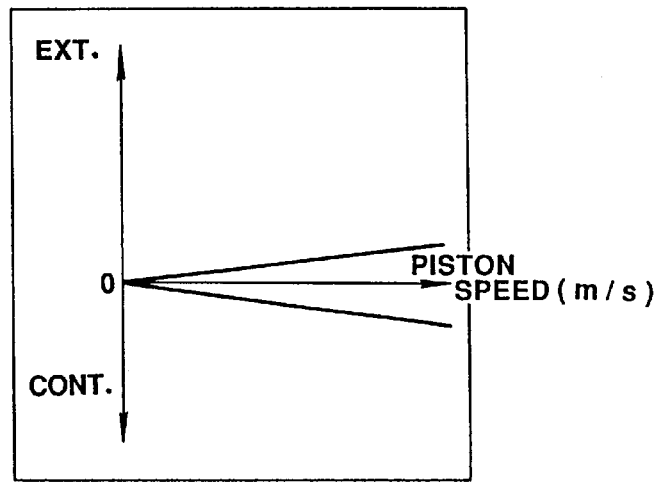
Figure 12:
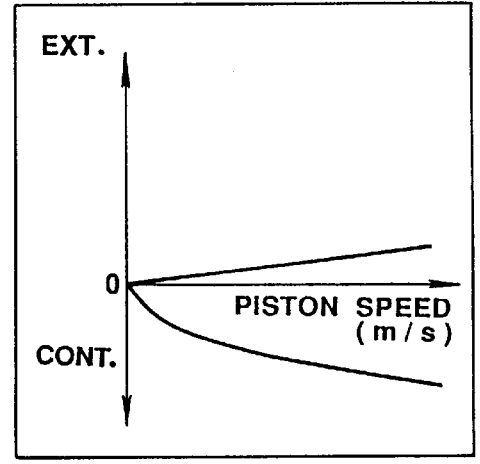

In addition, the damping force characteristic for each position of the adjuster 40 is shown in FIG. 10, FIG. 11, and FIG. 12.

Figure 13:
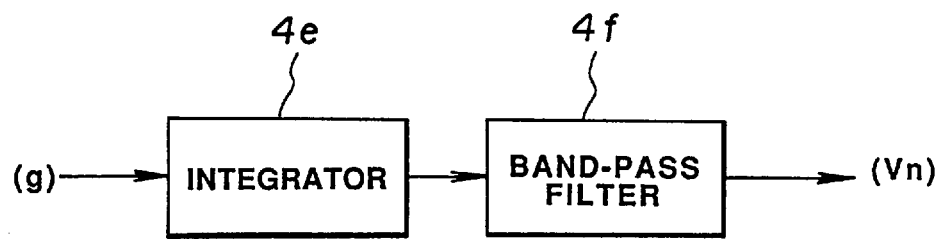
FIG. 13 is a circuit block diagram showing a circuit by way of which a vertical sprung mass acceleration signal is derived in the first preferred embodiment.

FIG. 13 shows a circuit block diagram of a vertical sprung mass acceleration signal processing circuit including the control unit 4 in the first preferred embodiment according to the present invention.

Figure 14:
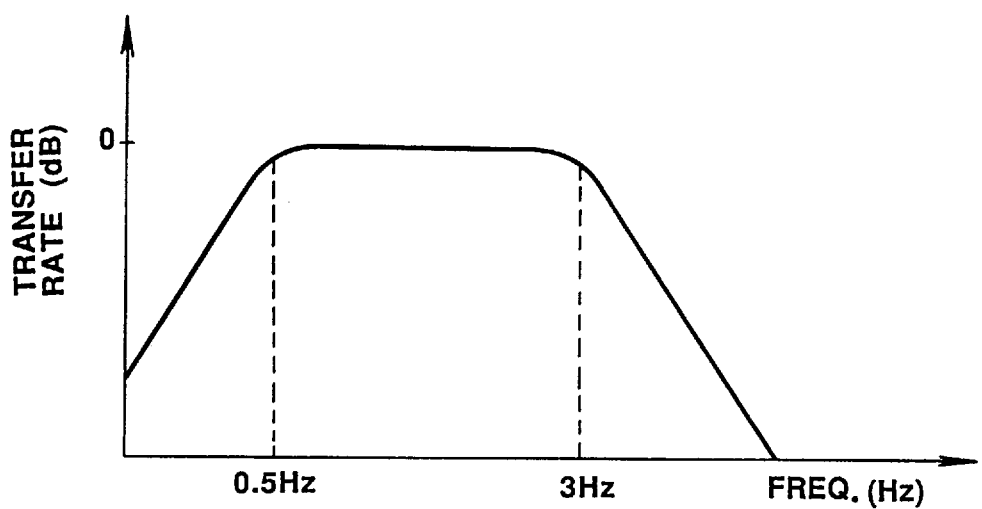
FIG. 14 is a graph showing the change in transfer rate with respect to the frequency of the vertical sprung mass acceleration signal.

In FIG. 13, an integrator 4e receives the vertical sprung mass acceleration g input from each vertical G sensor 1. A band-pass filter 4f filters the integrated signal from the vertical sprung mass acceleration sensor g and passes only a signal component of 0.5 Hz to 3 Hz. The characteristics of the band-pass filter 4f are shown in FIG. 14.

The sprung mass vertical sprung mass speed in the frequency region between 0.5 Hz and 3 Hz, is referred to as a "controlling sprung mass vertical speed $V_O$. The control unit 4 controls the damping coefficient on the basis of this controlling sprung mass vertical speed $V_O$. In addition, the band pass filter $4_f$ may be a first order, alternatively, a second order or a third order.

Figure 15:
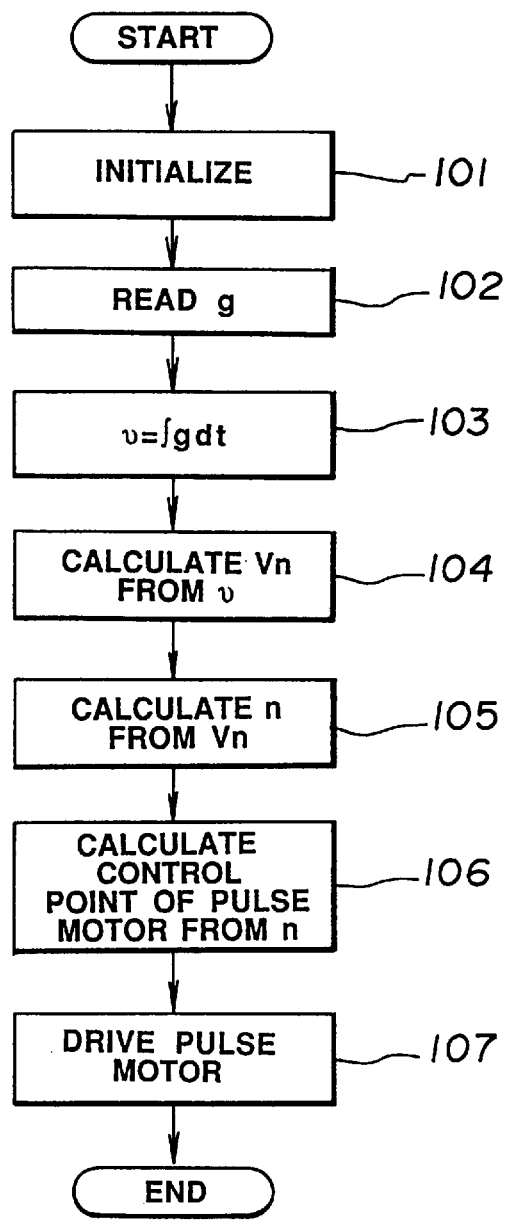
FIG. 15 is an operational flowchart executed by a control unit in the first preferred embodiment.

The operation of the control unit 4 to control the damping coefficient of each shock absorber SA toward a target damping coefficient position will be described below with reference to FIG. 15 and FIG. 16.

In a step 101, the control unit 4 initializes.

In a step 102, the CPU 4b of the control unit 4 reads the vertical sprung mass acceleration g.

In a step 103, the CPU 4b calculates the sprung mass vertical speed v from the sprung mass vertical acceleration value g. That is to say, the CPU 4b integrates the vertical sprung mass acceleration g by way of the integrator 4e (which can be constituted by, e.g., a digital low pass filter of 0.1 Hz) so that the integrated value is converted into the vertical sprung mass speed $V_n$.

In a step 104, the CPU 4b calculates the controlling sprung mass vertical speed $V_n$ after the processing of the band-pass filter 4f.

In a step 105, the CPU 4b calculates the target damping coefficient n according to the controlling point of the pulse motor 3.

In a step 106, the CPU 4b calculates the controlling point of the pulse motor 3 according to the target damping coefficient n.

In a step 107, the CPU 4b drives the pulse motor 3 toward the controlling point calculated in the step 106.

A subroutine which is used to calculate the target damping coefficient n on the basis of the controlling sprung mass vertical speed $v_n$ in the step 105, will be described with reference to FIG. 16.

Figure 16:
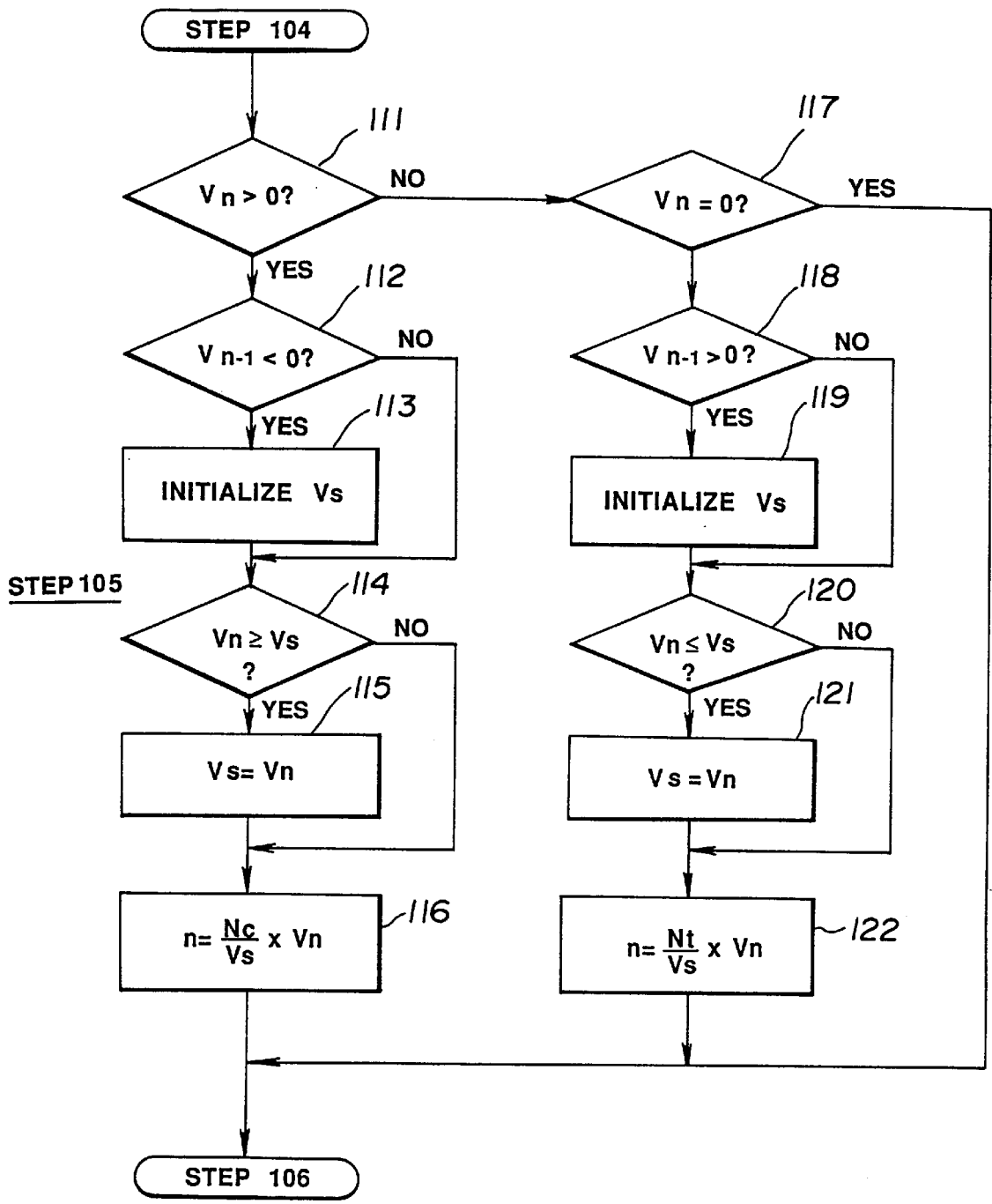
FIG. 16 is an operational flowchart showing a subroutine executed in step 105 of the routine depicted in FIG. 15, by the control unit in the first preferred embodiment.

As shown in FIG. 16, the CPU 4b determines whether the present controlling vertical sprung mass speed $V_n$ is positive or not.

If YES in the step 111, the routine goes to a step 112. If NO in the step 111, the routine goes to a step 117. More specifically, step 111 determines the stroke direction, i.e., whether the piston stroke of the shock absorber SA is an extension stroke or a contraction stroke. If YES, the CPU 4b determines that the piston stroke is an extension stroke and, if NO in the step 111, it is determined that either the piston stroke is a contraction stroke or there is no piston stroke at all.

In step 112, the control unit 4 determines whether the previous controlling vertical sprung mass speed $V_{n-1}$ was negative. If YES in the step 112, the routine goes to a step 113. If NO in the step 112, the routine goes to a step 114. Viz., in the steps 111 and 112, the CPU 4b determines whether the movement direction on the sprung mass with respect to the corresponding shock absorber SA has changed or not.

In the step 113, the CPU 4b of the control unit 4 initializes a threshold value $V_s$ for the vertical sprung mass speed and thereafter the routine goes to the step 114.

In the step 114, the CPU 4b determines whether the present controlling sprung mass speed $V_s$ is above the sprung mass vertical threshold value $V_s$. If YES in the step 115, the routine goes to a step 115. If NO in the step 114, the routine goes to a step 116.

In the step 115, the CPU 4b changes the vertical speed threshold value $V_s$ to the present controlling vertical sprung mass speed $V_n$.

Thereafter, the routine goes to the step 116.

In the step 116, the CPU 4b sets the target damping coefficient n for the extension stroke to execute the damping coefficient control. The target damping coefficient for the extension stroke n is expressed as follows: $n=(N_t/V_s) \times V_n$.

It is noted that the target damping coefficient n is derived so that the position of the adjuster 40 is at a predetermined position. It is noted that $N_T$ denotes an extension stroke maximum damping position.

In detail, in the steps 114 through 116, when the controlling vertical sprung mass speed $V_n$ exceeds a vertical sprung mass speed $V_s$, the CPU 4b determines that the target damping coefficient position is placed at the maximum damping coefficient position. On the other hand, when the controlling vertical sprung mass speed $V_s$ is below the sprung mass speed threshold value $V_s$, the CPU 4b determines the target damping coefficient n (damping coefficient) according to a rate thereof to the sprung mass speed threshold value $V_s$ with the maximum damping coefficient as a reference.

In the step 117, the CPU 4b determines whether the controlling sprung mass speed $V_n$ is zero. If YES in the step 117, the current run of this subroutine is ended. If NO in the step 117, the routine goes to a step 118.

In the step 118, the CPU 4b determines whether the previous controlling vertical sprung mass speed $V_{n-1}$ is positive. If YES in the step 118, the routine goes to a step 119. If NO in the step 118, the routine goes to a step 120.

In the step 120, in the same way as the step 115, the CPU 4b determines whether the present controlling sprung mass speed $V_n$ is above the threshold value $V_s$ for the vertical sprung mass speed. If YES in the step 120, the routine goes to a step 121. If NO in the step 121, the routine goes to a step 122.

In the step 122, in the same way as the step 116, the CPU 4b sets the target damping coefficient n to execute the damping coefficient control. The target damping coefficient n is expressed as follows: n $(N_c/V_s) \times V_n$.

It is noted that $N_c$ denotes the maximum damping position for the contraction stroke.

Figure 17:
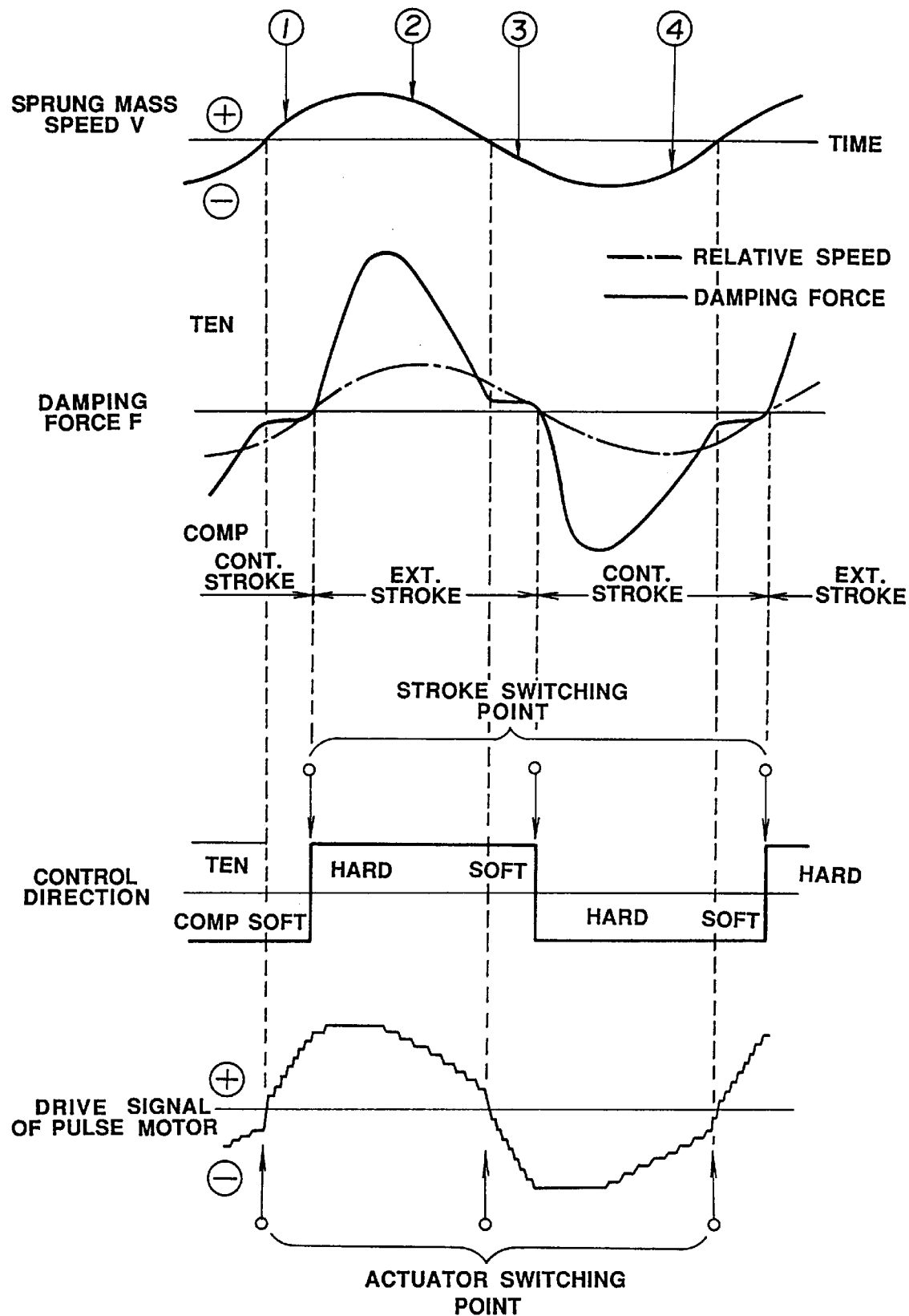
FIG. 17 is a timing chart depicting the operation of the suspension control system according to the first preferred embodiment.

FIG. 17 shows a timing chart of a series of operations of each essential part of the suspension control system in the first preferred embodiment when executing the routine depicted in the flowchart of FIG. 16.

As shown in FIG. 17, the control direction for the shock absorber SA is switched according to the vertical sprung mass speed v.

Figure 18:
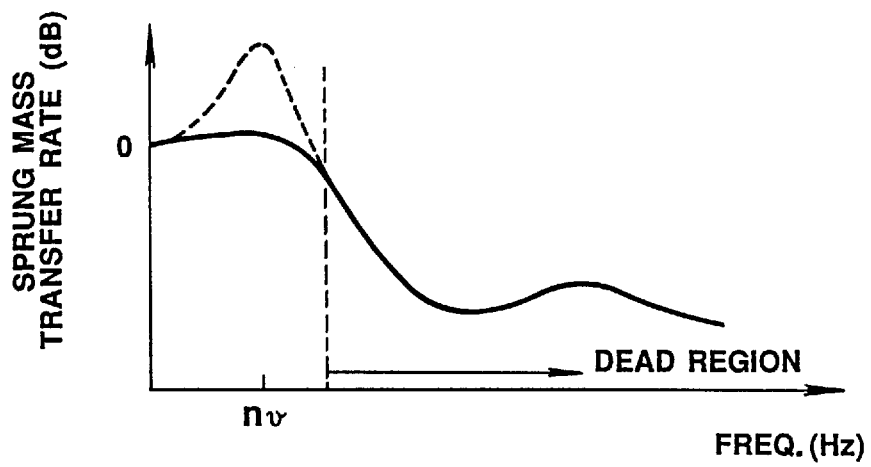
FIG. 18 is a characteristic graph showing the variation in sprung mass transfer rate with respect to the frequency of the vertical acceleration sprung mass.

As described above, since the sprung mass acceleration g is integrated to derive the vertical sprung mass speed v and the band pass filter 4f is converted into a characteristic controlling vertical sprung mass signal $V_n$ as shown in FIG. 13, to control the damping coefficient, the higher frequency components are cut off so that the corresponding control is not carried out. Therefore, as shown in FIG. 18, a low transfer rate occurs in the same way as a shock absorber set at a low damping coefficient, at a relatively higher frequency region than the sprung mass resonant frequency region $n_v$. Therefore, the vehicular comfort is improved.

That is to say, as shown in FIG. 18, the broken line trace denotes the sprung mass transfer rate characteristic produced by a shock absorber which is fixed to produce a low damping coefficient while the solid line trace denotes the sprung mass transfer rate characteristic produced by a shock absorber SA controlled in accordance with the first preferred embodiment.

Further, a high steering stability can be assured since resonance is suppressed as compared with the shock absorber SA set to produce low damping coefficient in a low frequency region including the sprung mass resonant frequency $n_v$.

Figure 19:
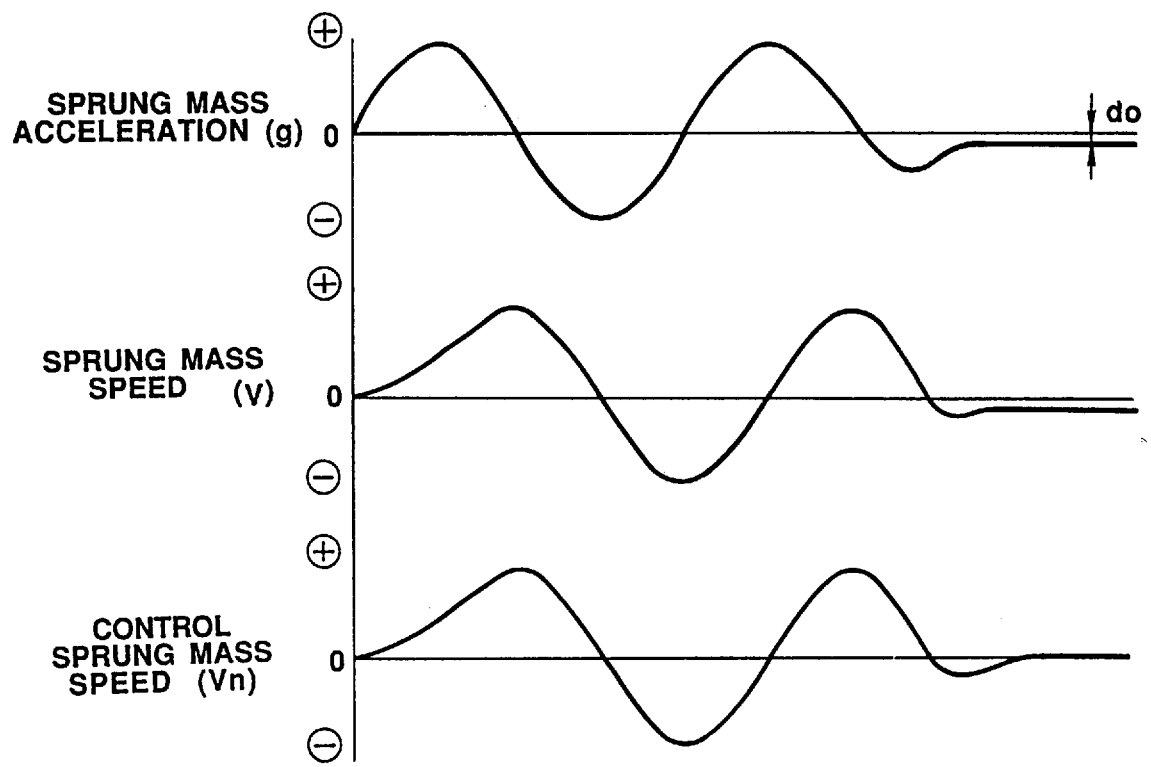
FIG. 19 is a timing chart showing the relationship between the sprung mass acceleration, sprung mass speed, and controlling sprung mass speed in accordance with the first preferred embodiment.

FIG. 19 is a timing chart showing the relationship between the acceleration and speed signals produced in accordance with the first preferred embodiment.

More specifically, timing chart shown in FIG. 19 indicates: the vertical sprung mass acceleration g corresponding to the vertical G sensor 1; the sprung mass speed v derived by integrating the vertical sprung mass g through the integrator 4e; and the controlling sprung mass speed $V_n$ after processing by the band pass filter 4f. As shown in FIG. 19, when the zero crossing of the vertical sprung mass acceleration g detected by the vertical G sensor 1 drifts or becomes offset in the downward direction (or upward direction) due to an ascending or descending slope, the CPU 4b processes the acceleration g to the controlling sprung mass speed $V_n$ and no effect on the controlling sprung mass speed occurs. The controlling sprung mass speed $V_n$ at the predetermined frequency region is accurately detected in the way described above so that an accurate damping coefficient control can be carried out.

(Second Preferred Embodiment)

A second preferred embodiment of the shock absorber SA shown in FIG. 20 will be described below.

Figure 20:
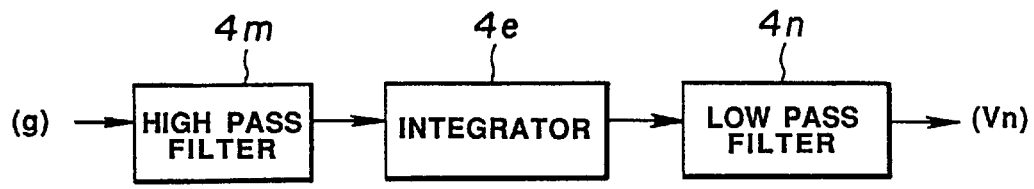
FIG. 20 is a circuit block diagram showing the arrangement of a high pass filter, integrator, and low pass filter in accordance with a second preferred embodiment according to the present invention.
Figure 21:
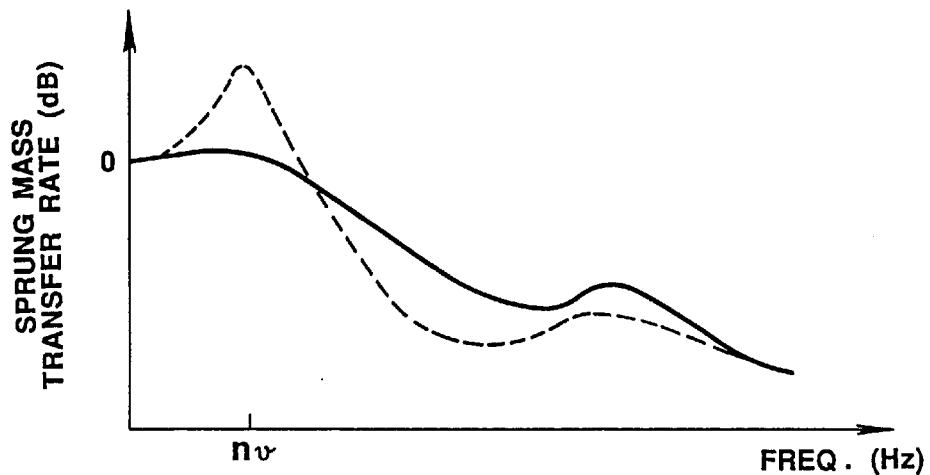
FIG. 21 is a characteristic graph showing the relationship between the sprung mass transfer rate and the frequency of the vertical sprung mass acceleration.

FIG. 20 shows an essential part circuit block diagram of the suspension control system in the second preferred embodiment.

In the second preferred embodiment, the band pass filter comprises a high pass filter 4m and a low pass filter $4_n$.

That is to say, a high pass filter 4m having a cut off frequency of 0.5 Hz and a low pass filter 4n having a cut off frequency of 3 Hz are interposed between the integrator 4e. The operation of the second preferred embodiment is the same as that in the first preferred embodiment. Consequently, a detailed description of the operation thereof is omitted.

In the first and second preferred embodiments, the control is carried out for each shock absorber SA, however, it should be noted that the control for those associated with the rear road wheels and the control for those associated with the front road wheels may be independently carried out.

In this case, the signals used for the control are carried out on the basis of either one of the front and rear tire wheels.

In the first and second preferred embodiments, when the damping coefficient at either or both of the extension and contraction strokes is set to the high damping coefficient position, the other stroke is fixed to the low damping coefficient position. However, the invention is not limited to this and the damping coefficient positions at both the extension and contraction strokes may be set.

(Third Preferred Embodiment)

Figure 22:
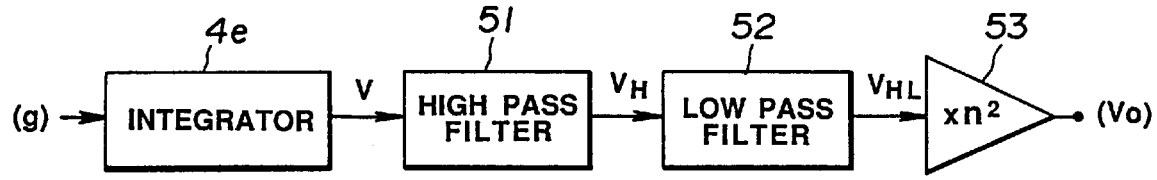
FIG. 22 is a circuit block diagram showing an essential part of the suspension control system according to a third preferred embodiment.

FIG. 22 shows an essential part circuit block diagram of the suspension control system according to a third preferred embodiment.

In the third preferred embodiment, an integrator 4e having the same construction as that used in the second preferred embodiment, is interposed between the vertical sprung mass acceleration sensor 1 and high pass filter, both the high pass and the low pass filters 51 and 52 have the same cut-off frequency as the vertical sprung mass resonant frequency, while a gain adjuster 53 which multiplies the gain by $n^2$ is arranged to receive the output of the low pass filter 52.

In the third preferred embodiment, the integrator 4e serves to convert the vertical sprung mass acceleration g into the vertical sprung mass speed V. Thereafter, both high pass filter 51 and low pass filter 52 serve to pass only the vertical resonant frequency components from the sprung mass speed V, and convert the vertical sprung mass speed $V_{HL}$ from which higher and lower frequency components are cut off. Then, the gain adjuster 53 serves to multiply the gain by $n^2$ and output controlling sprung mass speed $V_o$.

FIGS. 23(A) through 23(C) are views indicating the processing characteristics of both the high pass filter 51 and the low pass filter 52.

In FIGS. 23(A) through 23(C), the upper portions denote the gain characteristic and the lower portions denote the phase characteristics.

FIG. 23(A) shows the characteristics of the high pass filter 51, FIG. 23(B) shows those of the low pass filter 52, and FIG. 23(C) show those of both high and low pass filters 51 and 52.

As shown in FIG. 23(A) through 23(C), the gain in the vicinity to high pass filter 51 and low pass filter 52 is reduced to $1/n^2$. Thereafter, the gain adjuster 53 serves to multiply the gain by $n^2$ so that the reduction in the gain can be achieved. Therefore, both extremely low frequency and high frequency components are cut off and the controlling sprung mass speed $V_o$ with no reduction in the gain or the phase lag.

FIGS. 24(A) through 24(C) show characteristics (denoted by broken lines) before the processing of the vertical sprung mass acceleration signal and those (denoted by solid lines) after the processing of the vertical sprung mass acceleration signal. As appreciated from FIGS. 24(A) through 24(C), only sprung mass resonant frequency components of vertical sprung mass resonant frequency components are extracted.

Therefore, the sprung mass speed V calculated from the integrator 4e is derived from the vertical sprung mass acceleration from which the low frequency component and high frequency component excluding the vertical resonant frequency component of the vehicle body are cut off.

In addition, the gain in the vicinity to the vertical sprung mass acceleration resonant frequency which has been reduced by the filtering process, is adjusted by means of the gain adjuster 53. The control for the damping coefficient of each or any one of the shock absorber SA with no reduction of gain and phase lag can therefore be carried out.

As described hereinabove, since the band pass filter only passes a frequency component which falls in a frequency region including the vertical sprung mass resonant frequency and which excludes the low and high frequency components, such influences as zero crossing drift due to a temperature change and the offset due to ascending/descending slopes, can be eliminated. Consequently, an accurate vertical sprung mass speed can be derived. Since the high frequency component above the vertical sprung mass acceleration is cut off, a situation wherein no response to the high frequency component is required for the control, is achieved. The vehicular comfort can accordingly be achieved.

The deterioration of each pulse motor and adjuster is, thus, prevented. The reduction of the energy consumed can be achieved.

Various effects of the suspension control system according to the present invention can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the disclosed embodiments which can be embodied without departing from the principle of the invention as set forth in the appended claims.

What is claimed is:

1. A suspension control system for an automotive vehicle, comprising:
    a) at least one shock absorber, interposed between a vehicle body and a road wheel, having a piston member and a damping force coefficient varying means operatively changing its position in response to a control signal so that a damping force coefficient of at least one or both extension and contraction stroke sides of the piston member is set to a target damping coefficient effecting position according to its input control signal;
    b) at least one sprung mass acceleration detecting means for detecting a vertical sprung mass acceleration and outputting a vertical sprung mass acceleration signal indicative thereof;
    c) at least one sprung mass vertical velocity determining means comprising a digital type low pass filter type integrator, for integrating the vertical sprung mass acceleration signal to derive a vertical sprung mass velocity signal;
    d) band pass filtering means for passing only a signal frequency component of either the vertical sprung mass acceleration signal or the vertical sprung mass velocity signal whose frequency falls in a predetermined frequency region having an inherent sprung mass resonance frequency as its center frequency;
    e) setting means for calculating a threshold value for the vertical sprung mass velocity signal value;
    f) determining means for determining whether the vertical sprung mass velocity signal value derived using said band-pass filtering means is below the threshold value; and
    g) controlling means for outputting the control signal to the damping coefficient varying means according to a result of the determination of the determining means so as to control the damping coefficient to the target damping force coefficient.

2. A suspension control system for an automotive vehicle as set forth in claim 1, wherein said band pass filter comprises a high pass filter which is arranged at a stage before the integrator and a low pass filter which is installed at a stage after the integrator.

3. A suspension control system for an automotive vehicle as set forth in claim 1, wherein said at least one shock absorber comprises four shock absorbers interposed respectively between a vehicular body and front and rear tire wheels.

4. A suspension control system for an automotive vehicle as set forth in claim 1, wherein said band pass filter is arranged at a stage after the integrator.

5. A suspension control system for an automotive vehicle as set forth in claim 3, wherein the predetermined frequency region is 0.5 Hz through 3 Hz.

6. A suspension control system for an automotive vehicle as set forth in claim 1, wherein said band pass filter is comprises a high pass filter and low pass filter.

7. A suspension control system for an automotive vehicle as set forth in claim 4, wherein both said high pass and low pass filters are connected in series with each other at a stage after the integrator.

8. A suspension control system for an automotive vehicle as set forth in claim 7, which further includes a gain adjuster which serves to correct the gain of the band-pass filtered signal indicating the sprung mass speed.

9. A suspension control system for an automotive vehicle as set forth in claim 8, the gain is expressed as $n^2$.

10. A suspension damping force controlling apparatus, comprising:
    a) at least one shock absorber, interposed between a vehicle body and a road wheel, having a piston member and a damping force coefficient varying means operatively changing its position in response to a control signal so that a damping force coefficient of at least one or both extension and contraction strokes of the piston member is set to a target damping coefficient effecting position according to its input control signal;
    b) at least one sprung mass acceleration detecting means for detecting a vertical sprung mass acceleration and outputting a vertical sprung mass acceleration signal indicative thereof;

c) at least one sprung mass vertical velocity determining means for integrating the vertical sprung mass acceleration signal to derive a vertical sprung mass velocity signal indicative thereof;

d) band pass filtering means for passing only a signal frequency component of either the vertical sprung mass acceleration signal or the vertical sprung mass velocity signal whose frequency falls in a predetermined frequency region defined thereby with an inherent sprung mass resonance frequency as a center;

e) setting means for calculating a threshold value for the vertical sprung mass velocity signal value;

f) determining means for determining whether the vertical sprung mass velocity signal value derived through the band-pass filtering means is below the threshold value;

g) controlling means for outputting the control signal to the damping coefficient varying means according to a result of the determining means so as to control the damping coefficient to the target damping force coefficient; and h) gain compensating means for compensating a gain reduction and phase delay of the band-pass filtering means in the vicinities of its cut-off frequencies.

11. A method for controlling a damping coefficient of at least one shock absorber interposed between a tire wheel and vehicle body, comprising the steps of:

a) detecting a vertical sprung mass acceleration and outputting a vertical sprung mass acceleration signal indicative thereof;

b) integrating the vertical sprung mass acceleration signal to derive a vertical sprung mass velocity signal indicative thereof;

c) passing only a signal frequency component of either the vertical sprung mass acceleration signal or the vertical sprung mass velocity signal with a band-pass filtering means whose frequency falls in a predetermined frequency region with an inherent sprung mass resonance frequency as a center;

d) compensating a gain reduction and phase delay of the band-pass filtering means in the vicinities of its cut-off frequencies;

e) calculating a threshold value for the vertical sprung mass velocity signal value;

f) determining whether the vertical sprung mass velocity signal value derived through the band-pass filtering step of c) and compensated in the step d) is below the threshold value; and g) outputting a control signal to a damping coefficient varying means included in said shock absorber according to a determination whether the band-pass filtered and compensated vertical sprung mass velocity signal is below the threshold value in a manner to control the damping coefficient to the target damping force coefficient.

12. In a suspension having a shock absorber operatively interconnecting a vehicle body and a road wheel, a damping force control arrangement comprising:

damping force coefficient varying means which is responsive to a control signal for setting a damping force coefficient for one or both of extension and contraction strokes of the shock absorber to a target damping coefficient;

an accelerometer for detecting an absolute vertical acceleration of a vehicle body and producing a first signal indicative thereof;

means for integrating the first signal and deriving a second signal indicative of vertical velocity;

band pass filtering means for filtering said second signal and for passing a third signal having a frequency which falls in a predetermined frequency region having an inherent sprung mass resonance frequency as its center frequency, said band pass filtering means having first and second cut-off frequencies;

means for calculating a threshold value for the vertical sprung mass velocity signal value;

means for comparing the third signal with the threshold value;

means for outputting the control signal to the damping coefficient varying means in accordance with the comparison of the third signal with the threshold value; and gain compensating means for compensating for a gain reduction and phase delay of the band-pass filtering means in the vicinities of the first and second cut-off frequencies.

* * * * *